United States Patent

[11] 3,613,695

| [72] | Inventor | Ronald S. Kazdin |
| | | 4675 Walford Road, Apt. 13, Warrensville Heights, Ohio 44128 |
| [21] | Appl. No. | 786,101 |
| [22] | Filed | Dec. 23, 1968 |
| [45] | Patented | Oct. 19, 1971 |

[54] HAIRPIECE AND LAMINATED BASE THEREFOR
5 Claims, 5 Drawing Figs.

[52] U.S. Cl. .................................................... 132/53
[51] Int. Cl. .................................................... A41g 3/00
[50] Field of Search ........................................ 132/53, 54, 5, 9, 49, 60, 105; 2/199, 185 A, 207; 46/472; 206/46

[56] References Cited
UNITED STATES PATENTS

| 1,490,466 | 4/1924 | Hupka .......................... | 132/53 |
| 1,740,764 | 12/1929 | Bong ............................. | 132/5 |
| 2,503,552 | 4/1950 | Hassler ......................... | 206/46 |
| 2,602,460 | 7/1952 | Hull .............................. | 132/53 |
| 3,485,249 | 12/1969 | Mast ............................. | 132/53 |
| 1,464,089 | 8/1923 | Ernest .......................... | 132/53 |
| 3,165,107 | 1/1965 | Martin et al. ................ | 132/53 |
| 3,307,563 | 3/1967 | Reging ........................ | 132/53 |
| 3,266,500 | 8/1966 | Weld ............................ | 132/53 |
| 3,472,246 | 10/1969 | Ostrom ........................ | 132/53 |

*Primary Examiner*—Louis G. Mancene
*Assistant Examiner*—Gregory E. McNeill
*Attorney*—Freeman & Taylor

ABSTRACT: A base portion for hairpieces or toupees characterized by a laminated construction of plastic layers that provide a maximum of flexibility while retaining the originally formed contour of the base.

The base is additionally characterized by the use of layers of various colored plastic in the laminate for aesthetic purposes with alternate layers being of different characteristics so as to give the overall completed product a distinct and unique appearance.

It is also contemplated to further improve the unit by a new and unique method of tying the hair strands in place so as to permit the same to be combed in any direction.

PATENTED OCT 19 1971 3,613,695

INVENTOR.
RONALD S. KAZDIN
BY Freeman + Taylor
ATTORNEYS

HAIRPIECE AND LAMINATED BASE THEREFOR

BACKGROUND OF THE INVENTION

1. Field of the Invention

This invention relates to the field of artificial hairpieces and in particular relates to an improved base portion that is used in connection with such hairpieces together with an improved and unique way of assembling the hair strands to the base so as to give the user flexibility in arranging the hair.

2. Description of the Prior Art

The most pertinent patent known to applicant is Taylor U.S. Pat. No. 2,850,023 relating to a single material type of base construction as contrasted with the laminated construction employed by applicant.

SUMMARY OF THE INVENTION

It has been discovered that an improved hairpiece and base therefore can be obtained by constructing the base of a laminate of plastic material essentially comprising a bottom layer of rigid polyurethane material, a second layer of fairly rigid polyurethane material, a third layer of relatively soft polyurethane material and a fourth layer of gauze or other fabric material.

By use of a laminate of this type, it has been found that the hairpiece will retain its desired shape but will also provide improved comfort to the user.

It has also been discovered that the first, second and third layers can be made of clear material if desired so as to virtually eliminate any impression of an artificial member and essentially to expose the skin of the wearer to view.

On the other hand and if desired, it has been discovered that pigments can be added to the second layer with the third layer being transparent again for aesthetic purposes if desired.

It has also been discovered that the overall appearance and utilization of the hairpiece can be improved by attaching the individual hair strands to the fourth layer by means of a large loop-type connection which essentially results in the strand being loosely attached and, therefore, capable of being combed or styled in any desired fashion.

Production of a hairpiece and base therefor having the above-described characteristics accordingly becomes the principal object of this invention with other objects thereof becoming more apparent upon a reading of the following brief specification considered and interpreted in light of the accompanying drawings.

DESCRIPTION OF THE PREFERRED EMBODIMENT

Figure 1:
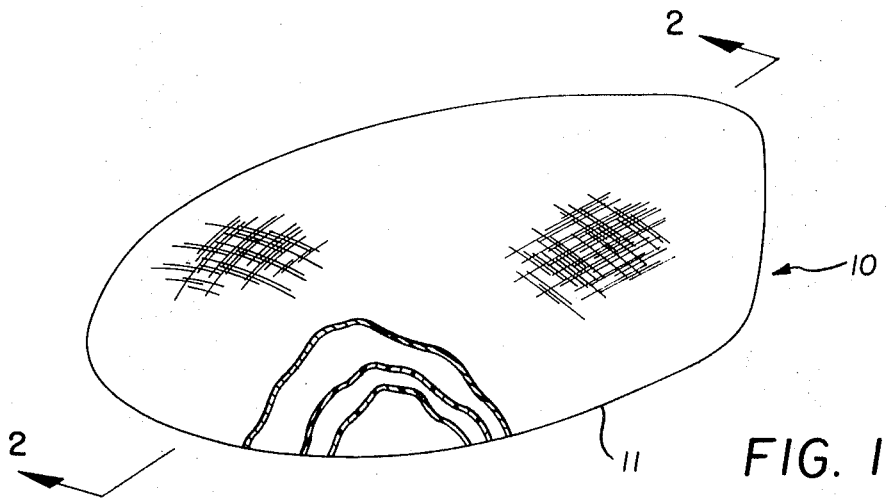
FIG. 1 is a perspective view partly broken away in section and showing the improved hairpiece.

Referring now to the drawings, the improved toupee, generally indicated by the numeral 10, includes a concavo-convex base member 11 having an undersurface 11a that is adapted to be placed against the wearer's skin as well as an outer surface 11b that is preferably made of a gauzelike material adapted to facilitate attachment of individual hair elements H,H to construct the hairy outer surface of the hairpiece.

Figure 2:
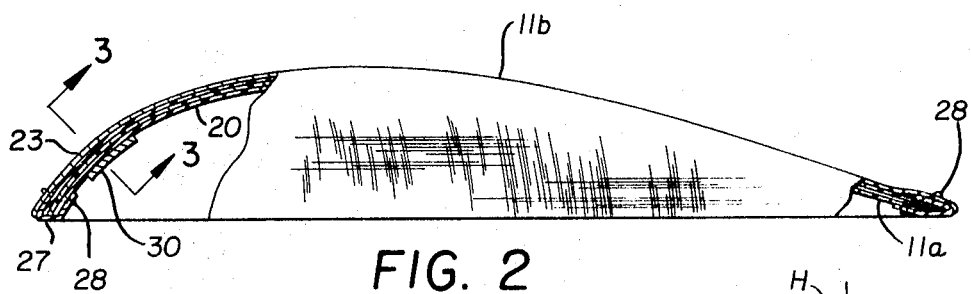
FIG. 2 is a sectional view taken on the lines 2—2 of FIG. 1.
Figure 3:
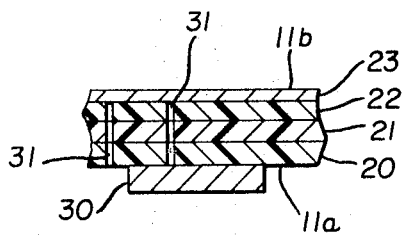
FIG. 3 is a sectional view taken on the lines 3—3 of FIG. 2.

Referring to FIGS. 2 and 3 it will be noted that the cross section of the base member is composed of a laminate including layers 20, 21, 22 and 23 with bottom layer 20 forming the bottom surface 11a of base 11 while the top layer 23 forms the top or outer surface 11b of base 11 as clearly shown in FIGS. 2 and 3 of the drawings.

Considering the laminated base 11 in greater detail then, the bottom layer 20 is preferably made up of a thermoplastic polyurethane material having tough elastomeric properties with a typical appropriate compound being Estane 5740X2*

*A Trademark for polymers made and compounded by B. F. Goodrich Rubber Co. and with the material being pressurized to densify the same to an appropriate thickness of approximately 0.010 inch. This layer 20 is preferably molded to conform to the contour of the user's head and, due to being densified, will tend to hold this contour during use.

The second layer 21 is designed to be the color-imparting layer and accordingly a material of a similar nature to the material of layer 20 is used except that in certain instances a color pigment is added to provide the appropriate color. In this regard, white is the normal pigment added but in certain instances it is preferable to have this layer and layer 20 transparent so that the wearer's skin can be seen through it without really noticing the presence of the base material. Again this material is densified to the same appropriate thickness as that of layer 20.

With reference to the third layer 22, this layer is preferably of the same material as the material of layers 20 and 21 but in this instance it is preferable not to densify the material so as to permit the same to have its original soft characteristic which facilitates holding of the top layer 23 in place, as will be explained more fully below. This layer 22 will normally have a thickness of from 0.012 to 0.015 inch in the preferred form of the invention. This layer can also be clear if desired.

Figure 4:
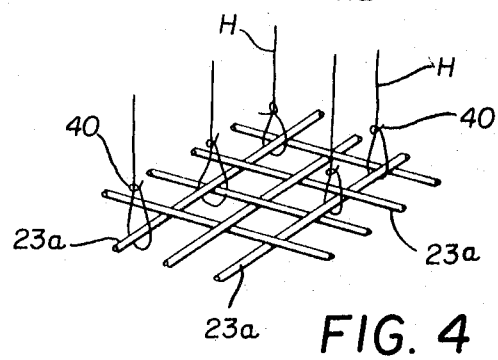
FIG. 4 is a perspective view greatly magnified and showing the method of loop construction wherein the hair is secured to the base member.

The top layer 23 is generally made up of a network of woven strands 23a, 23a in the form of a gauze pad with these strands serving as an attaching base for securing the hair strands H,H thereto as is clearly apparent from FIG. 4 of the drawings. Accordingly, while the strand or network of lines is shown greatly magnified in FIG. 4, it is to be understood that in reality the spacing between adjacent- and right-angle strands is relatively close and the layer 23 is of a relatively fine mesh gauze. Also, the fact that the third layer 22 is used in its undensified state gives its outer surface a rough, nonskid characteristic which also facilitates holding layer 23 in place thereon.

In addition to the aforementioned component parts, the entire unit is preferably stitched together around the edges with a binder strip 27 that is held in place with respect to the edges of the layers by the stitching 28,28.

In view of the fact that the individual base portions are contoured to fit the heads of an individual user, it is necessary that the same have a "memory" property that permits the same to be returned to their original molded position regardless of the fact that the same are flexed or otherwise bent during use. Accordingly, and while the densified plastic of layers 20 and 21 will have a modicum of "memory" properties, the layer 22, not being densified, does have the optimum amount of "memory" property. The memory of this is sufficient to return all of the laminated layers to the originally cast position at any time during use due to the fact that all layers are held together by binder strip 27.

Conventional felt or fabric pedestals 30,30 may also be used at varying points around the periphery of layer 20 to space the base 11 from the skin of the user for comfort purposes and additionally in this same regard air holes 31, 31 may be provided in one or more of the layers as clearly shown in FIG. 3.

With reference to the improved loop construction above referred to with regard to hair strands H,H, this is shown in FIG. 4 wherein a knot 40 is tied in such a fashion that a relatively large diameter loop is provided around the strand members 23a, 23a. By this arrangement the hair H is free to be directed in any fashion because of the fact that the loop can lie forward, sideways or frontward depending upon the desire of the user.

In use or operation of the improved device a cast is made of the wearer's head and from this cast a plastic mold is made upon which the laminate can be assembled under pressure.

The laminate is assembled so that when layers 20, 21, 22 and 23 are sandwiched together as shown in FIG. 3 under the application of pressure and heat it is merely necessary that the individual strands of hair be tied to the fabric layer 23 so as to produce a completed hairpiece of the type shown in FIG. 1.

Due to the novel loop construction disclosed herein, the hair H,H can be combed in any direction thereby giving the user considerable freedom in styling.

Also, the material used in layers 20, 21 and 22 is generally impervious to natural body acids thereby avoiding discoloration or other undesirable effects due to prolonged use in close contact with the user's skin.

Figure 5:
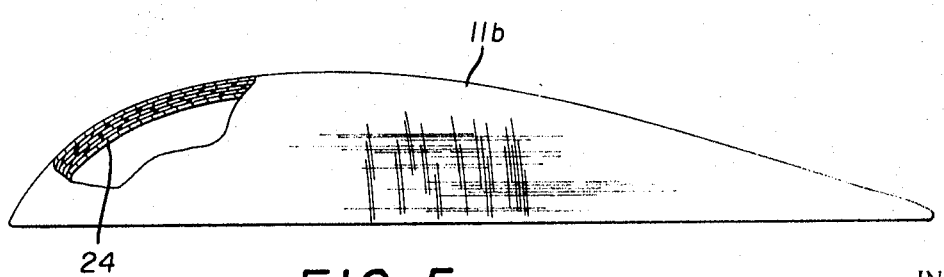
FIG. 5 is a view similar to FIG. 2 showing a modified form of the invention.

FIG. 5 also shows a modification of the invention where, in addition to the components described above, a fabric liner 24 can be applied to the bottom of layer 20 to improve the comfort of the user. (See FIG. 5).

It should be noted that while certain densities have been cited with regard to certain of the layers that these are representative only and the invention is not intended to be limited to any specific dimensions.

Similarly, while one specific commercial material has been referred to with regard to layers 20, 21 and 22, this is also set forth by way of example and other materials having appropriate physical properties could also be used.

It has been shown how, therefore, an improved base for a hairpiece can be provided by utilizing a laminate of plastic materials which provides improved aesthetic and functional properties.

It has also been shown how improved aesthetic properties can be achieved by the novel method of attaching the hair strands to the base.

While a full and complete description of the invention has been set forth in accordance with the dictates of the patent statutes, it is to be understood that the invention is not intended to be limited to the specific form herein shown. Accordingly, modifications of the invention may be resorted to without departing from the spirit hereof or the scope of the appended claims.

What is claimed is:

1. A hairpiece of the character described, comprising;
    A. a first layer of densified rigid plastic material contoured to fit the user's head;
    B. a second layer of densified rigid plastic material superimposed on said first layer;
    C. a third layer of flexible plastic material superimposed on said second layer;
    D. a fourth layer of gauze material comprising a network of woven strands superimposed on said third layer;
    E. means securing said first, second, third and fourth layers together to form a laminate; and
    F. a plurality of strands of hair secured to said fourth layer.

2. The device of claim 1 further characterized by the fact that said strands of hair have one end loosely looped about said strands of said fourth layer whereby the remaining portions of said hair may be moved freely relatively of said base.

3. The device of claim 1 further characterized by the fact that said first, second and third layers are transparent.

4. The device of claim 1 further characterized by the fact that said second layer is pigmented and said first and third layers are transparent.

5. The device of claim 1 further characterized by the presence of a fabric liner secured to and underlying said first layer.